United States Patent [19]

Bross, Jr. et al.

[11] 4,359,673
[45] Nov. 16, 1982

[54] ELECTROMAGNETICALLY ACTUATED LINEAR RECIPROCATING SELF-TIMED MOTOR

[76] Inventors: Augustus T. Bross, Jr., P.O. Box 1553, Alvin, Tex. 77511; Michael Brown, 19 El Dorado, Friendswood, Tex. 77576

[21] Appl. No.: 180,180

[22] Filed: Aug. 21, 1980

[51] Int. Cl.³ ............................................. H02K 33/00
[52] U.S. Cl. .................................... 318/38; 318/119; 318/135; 310/12; 310/24
[58] Field of Search ................. 318/38, 37, 135, 119; 310/14, 13, 12, 24, 22

[56] References Cited
U.S. PATENT DOCUMENTS

| | | | |
|---|---|---|---|
| 758,225 | 4/1904 | Vanderbeck | 310/22 |
| 3,419,739 | 12/1968 | Clements | 310/12 X |
| 3,832,608 | 8/1974 | Mills | 310/24 X |
| 3,967,146 | 6/1976 | Howard | 310/24 X |
| 4,012,675 | 3/1977 | Schulze, Jr. | 310/24 X |
| 4,019,103 | 4/1977 | Davis et al. | 310/24 X |

Primary Examiner—B. Dobeck
Attorney, Agent, or Firm—Sughrue, Mion, Zinn, Macpeak & Seas

[57] ABSTRACT

An electromagnetically actuated, linear reciprocating self-timed motor employs plural reciprocating electromagnet pistons which oscillate between opposed fixed electromagnets having primary and secondary coils. The fixed electromagnets are alternately energized to effect large repulsion forces between the fixed electromagnets and the reciprocating electromagnet pistons. Secondary coils carried by the fixed electromagnets cause electrical energy induced therein during reciprocation of the pistons to be fed back to the d.c. source supplying energy to the primary coils of the fixed electromagnets. A crankshaft driven rotor bearing permanent magnets develop signals within stationary pick-up coils for controlling switches for timed energization of the primary coils of the fixed electromagnets.

10 Claims, 12 Drawing Figures

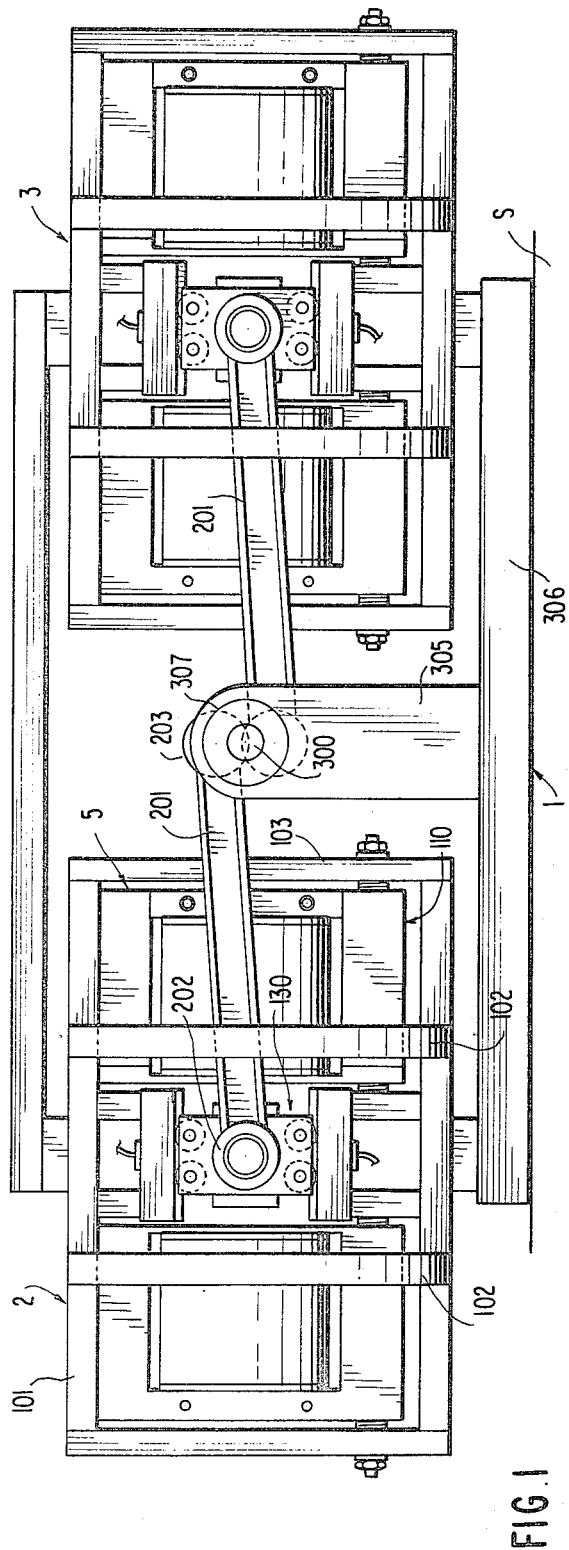
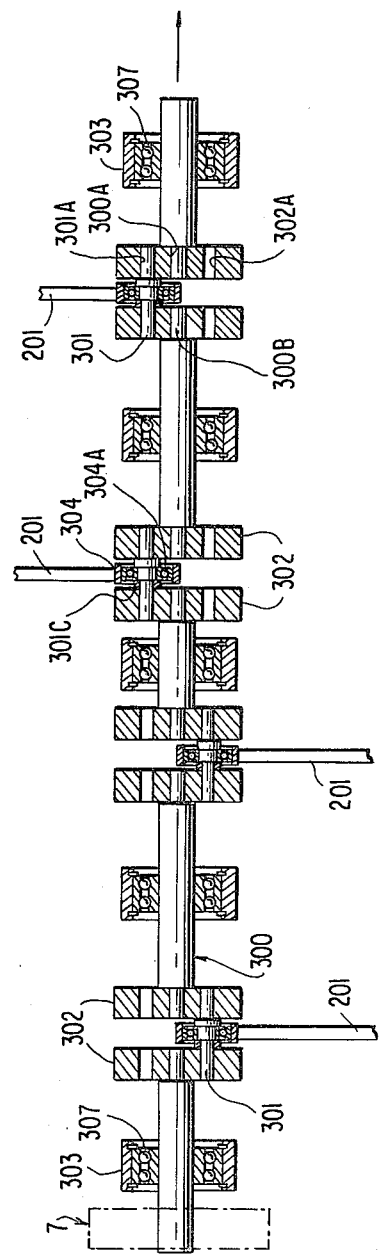
FIG. 1
FIG. 2

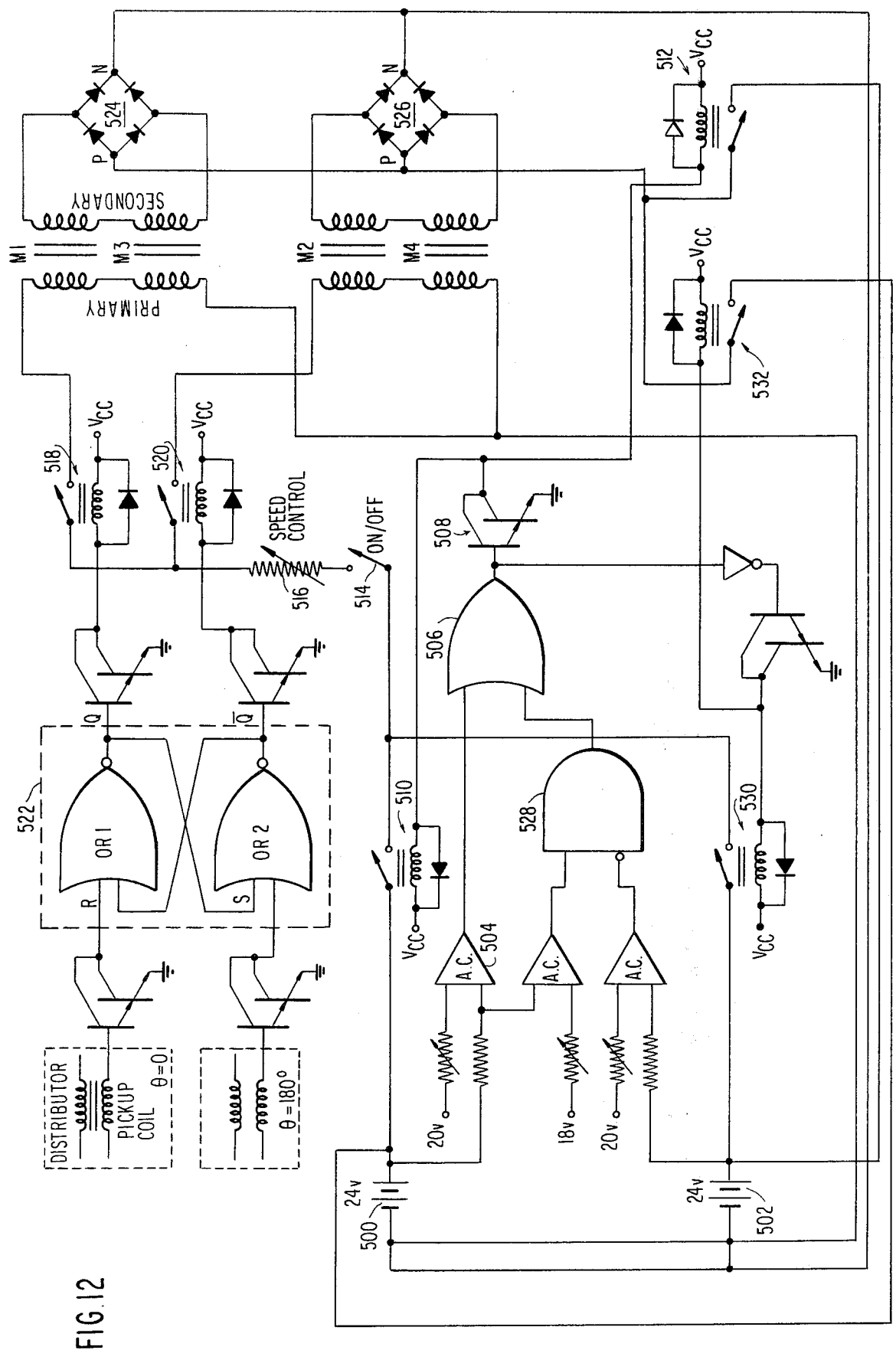

4,359,673

ELECTROMAGNETICALLY ACTUATED LINEAR RECIPROCATING SELF-TIMED MOTOR

FIELD OF THE INVENTION

This invention relates to electromagnetically actuated, linear reciprocating self-timed motors, and more particularly to such motors employing primary and secondary coils to permit induced energy feedback to the voltage source feeding the primary coils.

BACKGROUND OF THE INVENTION

Traditionally reciprocating engines have been of the internal combustion type, wherein a gas-air mixture is exploded in the cylinder housing to drive the piston. In conventional four stroke engines, this results in only one power stroke for every two crank revolutions. Consequently, these engines are very inefficient. In addition, as has become painfully obvious in recent years, such internal combustion engines rely on a natural resource oil or gas fuel which is fast dwindling. However, the worst feature of all is the fact that these engines are severe polluters of the environment. Hence, there is a definite need for an alternative power source.

There have, in the past, been several unsuccessful attempts to produce a reciprocating engine driven by magnetic forces. The prior art, of which applicant is aware, includes U.S. Pat. Nos. 1,198,934, 2,296,554, 3,939,367 and 3,949,249. While these patents are exemplary of magnetic reciprocating engines or motors, the structures of the patents have failed to come to grips with two basic design aspects. The first, since magnetic force varies inversely as the square of the distance over which it acts, it is highly desirable to use magnetic repulsive forces rather than those of magnetic attraction to drive the piston or pistons. This is because repulsive force can be used to fire the piston when it is in very close proximity to the driving magnet, whereas the forces of attraction must initially be exerted over a much greater distance (i.e., the length of the stroke). Thus, by utilizing the repulsive interactions, one obtains a force-crank angle relationship similar to that of the internal combustion engine during its power stroke. This is desirable since the piston will initially experience a very large driving force which drops off rapidly as the piston moves relative to the driving magnet so that at the end of the stroke the piston may be stopped with relative ease (at a point where magnetic repulsion is at a minimum). By using the forces of attraction, one obtains quite the opposite effect. This results in an inefficient power stroke which subjects the connecting parts to great stress at the end of each stroke. Secondly, the energy losses which have traditionally mitigated against electromagnetically actuated reciprocating motors are hystersis and eddy current losses. These problems have to be solved at their source. By utilizing modern grain oriented electrical sheet metals and modern lamination techniques, one can hold such losses to a minimum.

It is a well known fact that electric motors are among the most efficient energy converters available today. Despite their wonderful energy conversion characteristics, however, these motors require prohibitively larger power supplies for most purposes.

It is therefore the object of the present invention to provide an improved electromagnetically actuated, linear reciprocating self-timed motor which has increased power, which uses direct current which eliminates the necessity for reversing polarity during reciprocation of the piston. It is a further object of the present invention to provide an improved electromagnetically actuated, linear reciprocating self-timed motor which utilizes dual electromagnetic coils constituted by primary and secondary windings instead of simply one coil electromagnets to drive the pistons and thereby recycle the induced current from the secondary winding as a result of piston movement relative to the relatively fixed driving coil assembly.

BRIEF DESCRIPTION OF THE DRAWINGS

FIG. 1 is a front elevational view of the improved electromagnetically actuated, linear reciprocation self-timed motor forming one embodiment of the present invention.

FIG. 2 is a top planned view of the crankshaft assembly of the motor of FIG. 1.

FIG. 12 is a schematic illustration of the motor control circuitry.

DESCRIPTION OF THE PREFERRED EMBODIMENT

Figure 9:
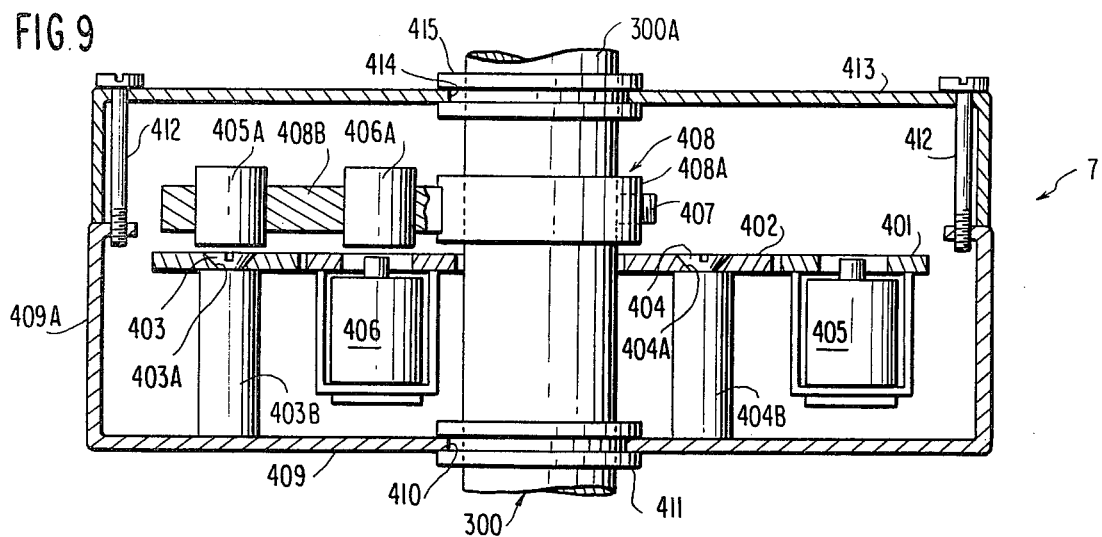
FIG. 9 is a horizontal, sectional view of the timing distributor assembly for the motor of FIG. 1.
Figure 10:
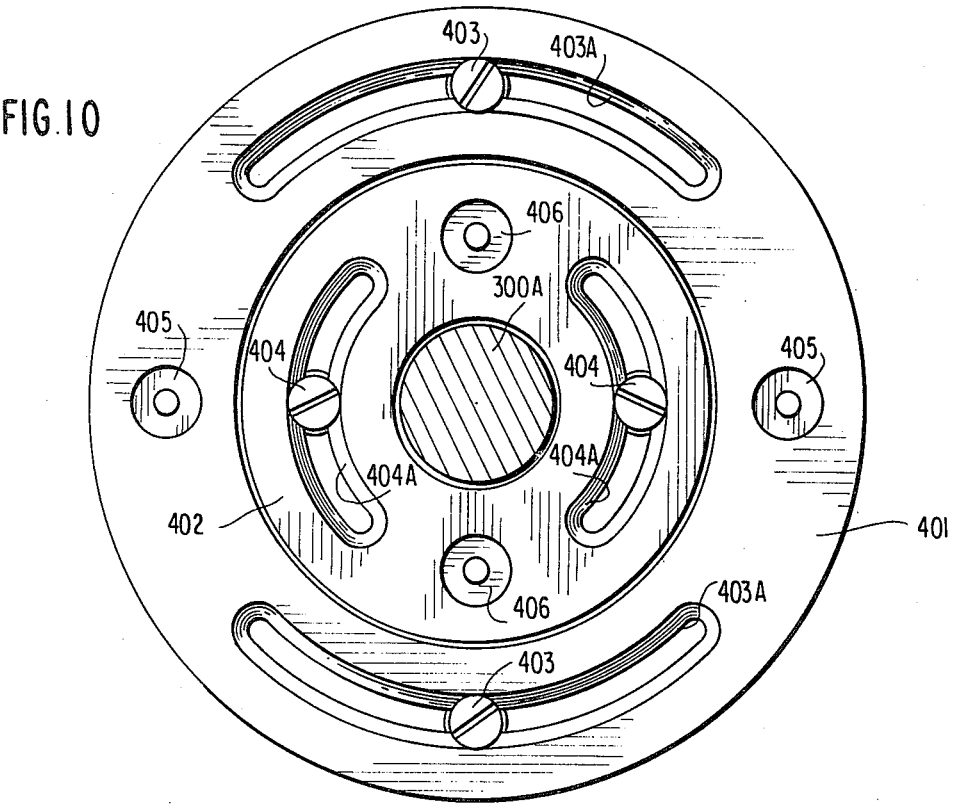
FIG. 10 is an end view of the top planned view of the rotor timing distributor of FIG. 9.
Figure 11:
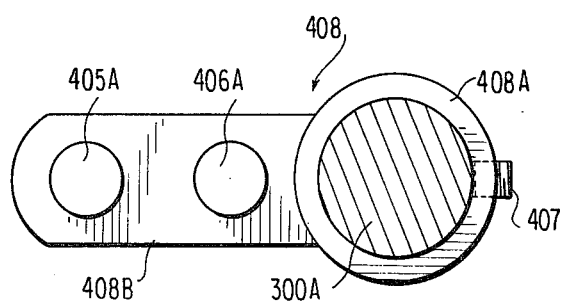
FIG. 11 is a plan view of rotor assembly of FIG. 9.

Referring first to FIG. 1, the improved electromagnetically actuated, linear reciprocating self-timed motor of the present invention is comprised of a rectangular case indicated generally at 1, within which mounts the basic elements of the motor. The motor is divided essentially about a vertical center line, FIG. 1, into a left cylinder bank indicated generally at 2 and a right cylinder bank indicated generally at 3. For each cylinder bank, there are three main components, a central and laterally reciprocating electromagnetic piston assembly indicated generally at 4 and, at opposite sides thereof and in line with that reciprocating piston assembly, end magnets, generally indicated at 5. Interposed between the left and right cylinder banks 2 and 3, is a crankshaft assembly indicated generally at 6 which is mechanically coupled to the various piston assemblies 4 to transform the reciprocating movement of the piston assemblies 4 into a shaft rotation. The crankshaft assembly 6 includes as a principal component a crankshaft indicated generally at 300 which terminates at one end in a timing distributor assembly indicated generally at 7 in dotted line fashion, FIG. 2. The timing distributor assembly components are generally shown in FIGS. 9, 10 and 11. Both the electromagnetic pistons assemblies 4 and the end magnet assemblies 5 bear electromagnetic coils which are energized from a direct current source. In this case, a 24 volt d.c. battery is employed as the power source to the reciprocating electromagnetic motor.

Figure 3:
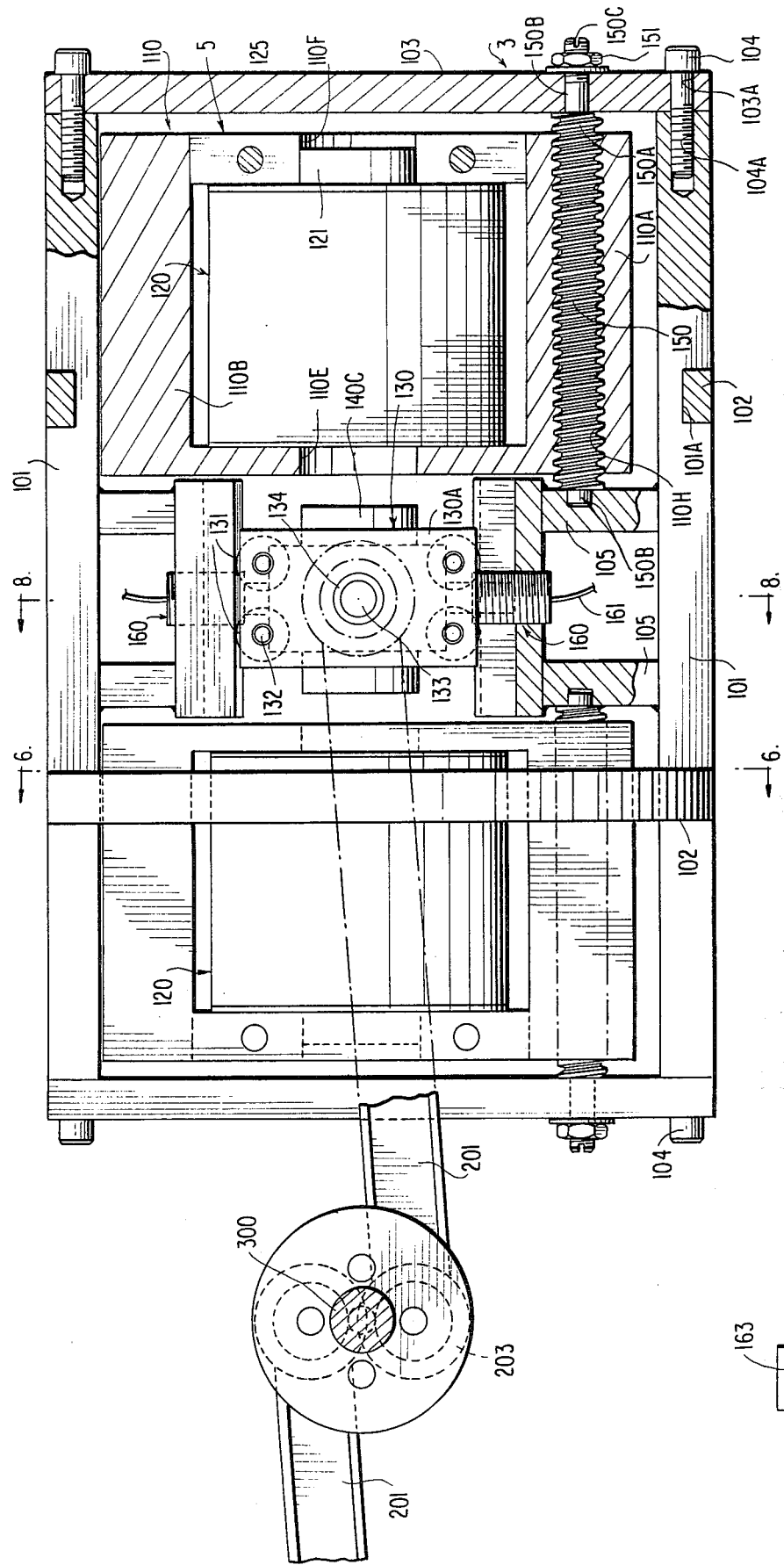
FIG. 3 is a front elevational view of a portion of the motor shown in FIG. 1, partially cut away to illustrate the right cylinder bank.

Referring to FIGS. 1 and 3, the outer case 1 consists as indicated previously of left and right cylinder banks 2 and 3, respectively. As specifically shown in FIG. 3, the right cylinder bank 3 comprises a cylinder casing indicated generally at 100 which houses two end magnet holders indicated generally at 110, two end magnets 120 and one piston magnet holder indicated generally at 130. The piston magnet holder 130 forming the principal component of the piston assembly 4 bears a single piston as at 140. Two adjustment screws 150 are provided for physically adjusting the longitudinal position of the magnet holders 110 to the right and left of the piston assembly 4 and thus, setting the gap between the piston 140 and the two end magnets 120 on opposite sides thereof.

Figure 4:
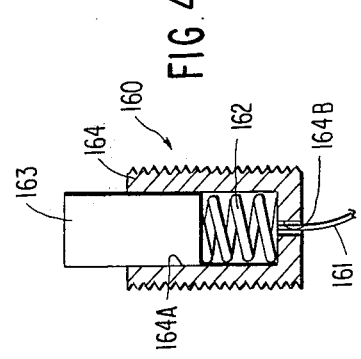
FIG. 4 is a sectional view of the electrical brush assembly employed in the motor of FIG. 1.
Figure 5:
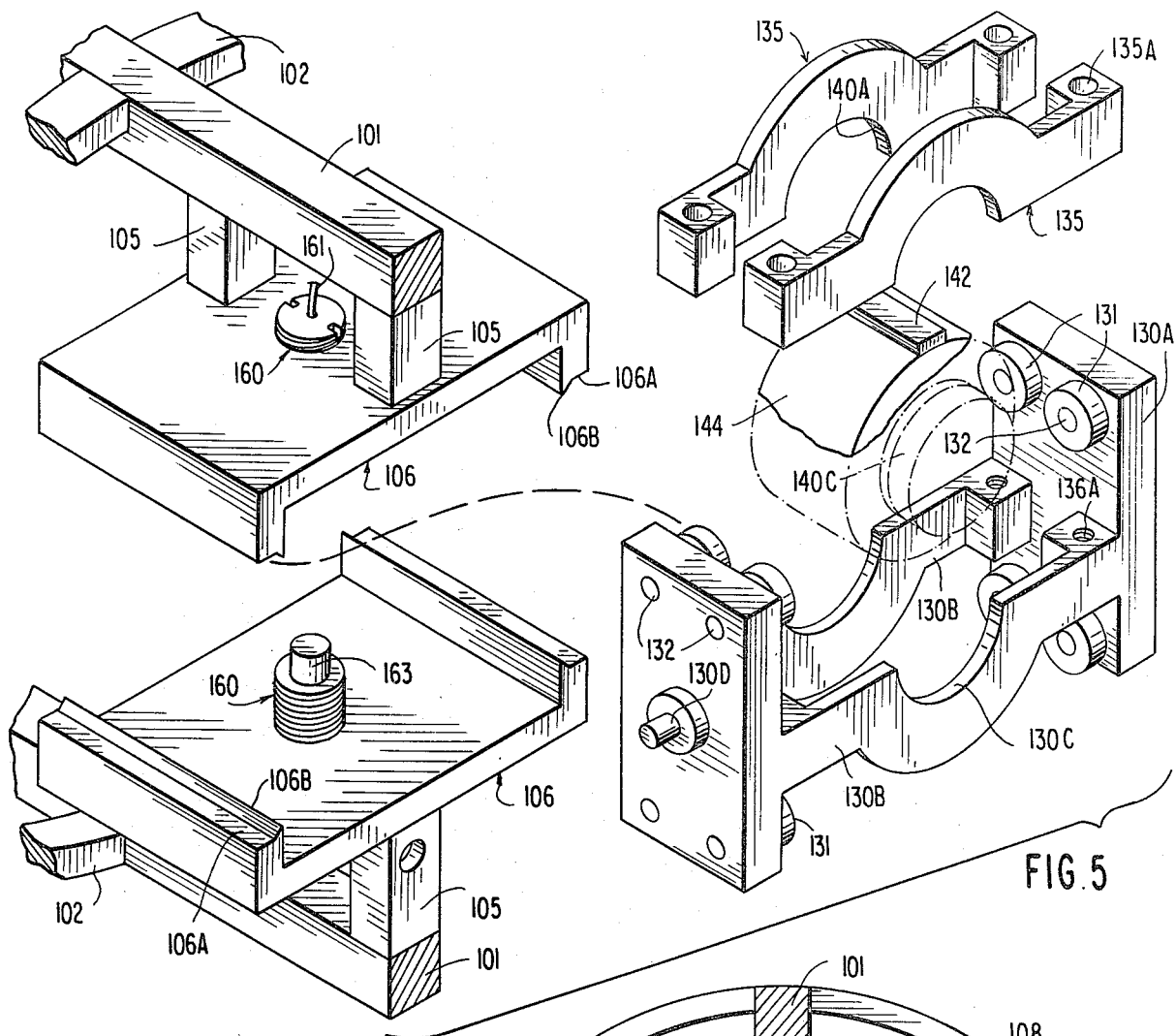
FIG. 5 is an exploded, perspective view of the piston assembly forming a major component of the motor of FIG. 1.

The cylinder housing 100 comprises two main supports in the form of horizontal struts 101 which are linked intermediate of their ends by way of two internal cross members 102 which span between the diametrically opposed horizontal struts 101. At the ends of the horizontal struts 101, there are provided respectively, end cross members 103. The end cross members 103 are bolted to the horizontal struts by bolts 104 which are received within tapped and threaded holes 104A within the ends of the horizontal struts 101, the bolts 104 protruding through drilled holes 103A. The piston assembly 4 components are mounted for reciprocation by way of legs 105 to which are welded at one end, the horizontally disposed piston track member 106. Track member 106 is U shaped forming laterally spaced tracks 106A. The legs 105 are welded at their ends opposite track member 106 to the cylinder housing or casing horizontal struts 101 at the top and bottom of the right and left cylinder banks. The piston track member 106 bears holes at 106C which hole is threaded so as to receive a threaded copper sleeve 164 of the electrical brush assembly 160. A carbon brush 163 which is a cylindrical member, is slidably positioned within the bore 164A of copper sleeve 164 which extends almost the complete length of the copper sleeve 164. A small diameter hole 164B is drilled within the bottom of the sleeve 164 to permit a lead or conductor 161 to pass therethrough, the conductor 161 being soldered to the copper sleeve such that a current is connected via the carbon brush to the coil of piston 140 borne by the piston magnet holder 130. Coil spring 162 is interposed between the carbon brush 163 and the bottom of the copper sleeve 164 bearing that carbon brush so as to bias the carbon brush outwardly as shown in FIG. 4.

Figure 7:
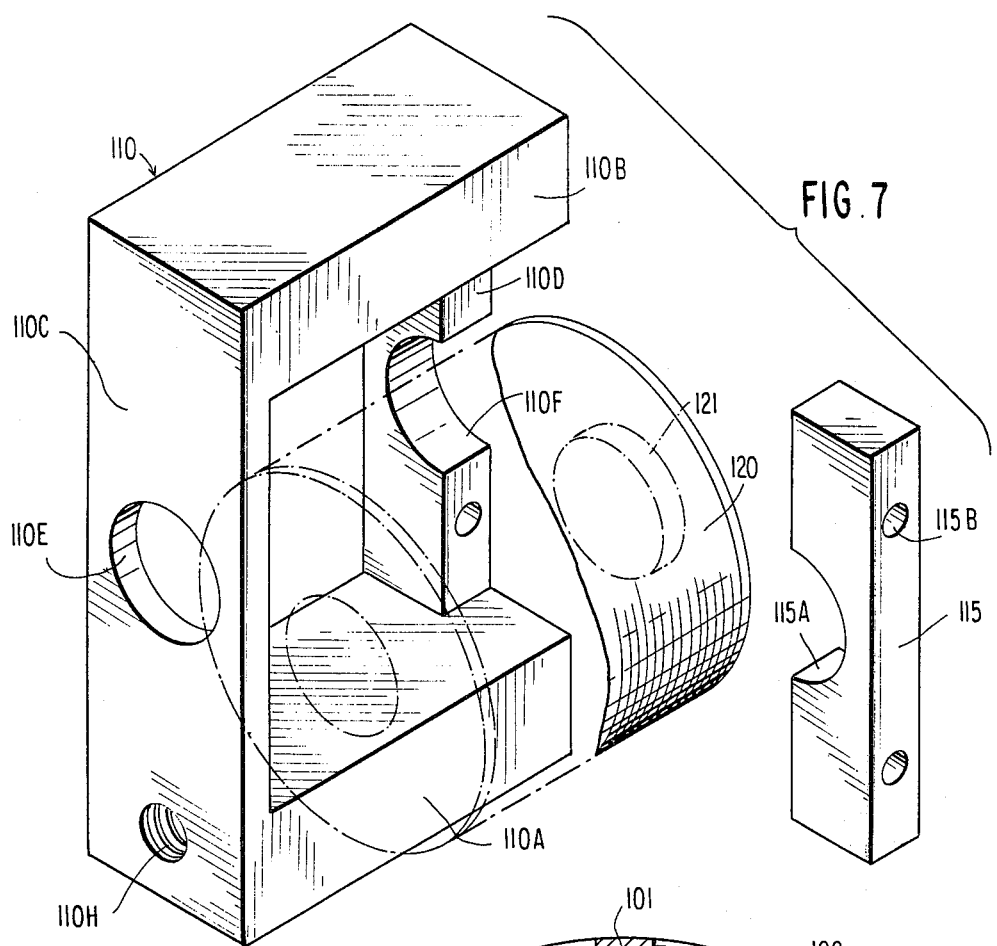
FIG. 7 is an exploded, perspective view of the principal components of the driving coil assembly forming one end magnet for the cylinder head of FIG. 3.
Figure 8:
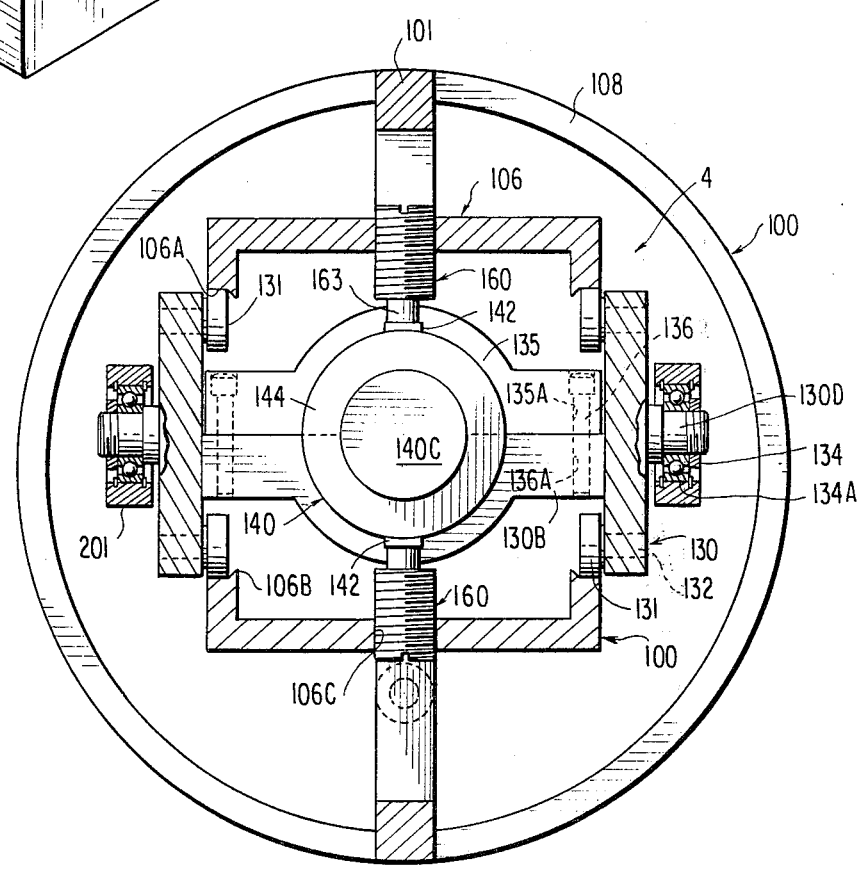
FIG. 8 is a vertical, sectional view of a portion of the cylinder head of FIG. 3 taken about line 8—8.

Each end magnet holder 110 for each end magnet assembly 5 is of rectangular open frame construction comprises a C-shaped block of magnetic material, FIG. 7, including a relatively thick base 110A and top segments as at 110B, the base and top segments being connected together by way of longitudinally spaced vertical guide wall 110C at the front of that assembly and a much thicker vertical rear wall as at 110D. The walls 110C and 110D are integral with the base 110A and top portion 110B of the end magnet holder 110 but wall 110D extends only to the center line of the end magnet 120 borne by this portion of the assembly. Walls 110C and 110D bear circular recesses as at 110E and 110F, respectively. Hole 110E within wall 110C allows the projecting end 140C of piston 140 to project therein during piston reciprocation.

Figure 6:
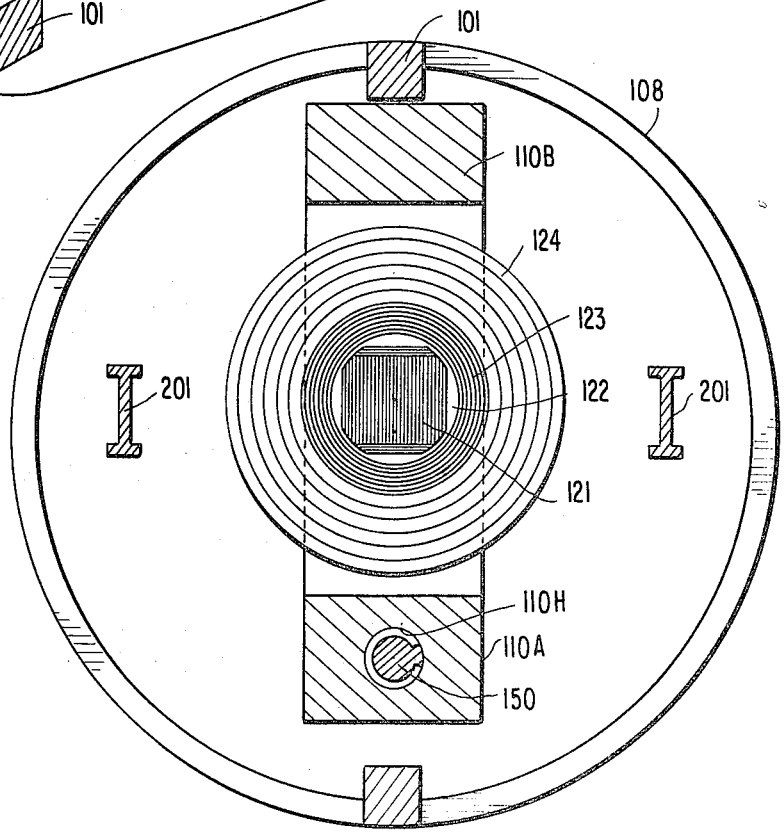
FIG. 6 is a vertical, sectional view of a portion of the cylinder head of FIG. 3 taken at about line 6—6.

The end magnet assembly is completed at the rear (relative to the proximity of each end magnet assembly to the reciprocating piston) by the mounting of a rectangular shaped magnetic material vice clamp 115 between the base 110A and the top 110B of the end magnetic holder. The vice clamp 115 mounts to the face of side wall 110D, the vice clamp 115 bearing a semi-circular recess 115A to one side, which is a minor image of the recess 110F within side wall 110D. The vice clamp 115 includes holes 115B through which bolts 114 pass, the bolts 114 being received within tapped and threaded holes 114A of the side wall 110D at positions both below and above the recess 110F. At that end of the assembly the core 121 projects from the end of end magnet 120 and opposed sides are received within recesses 110F and 115A of members 110B and 115, respectively. The laminated core 121 which is formed of ARMCO M-6 magnetic steel, for instance, is surrounded by several layers of cambric insulation 122, FIG. 6, wrapped by 400 secondary wraps of 18 gauge magnet wire, forming primary coil 123. Primary coil 123, in turn is wrapped by 400 primary wraps of 12 gauge magnet wire, forming secondary coil 124. The primary and secondary coils 123 and 124 are held on either end by spool fittings 125. The secondary winding or coil 124 has a positive lead 123A and a negative ground 123B. Similarly, the primary winding or coil 123 has a positive lead 124A and a negative ground 124B.

Turning next to FIGS. 3, 4, 5 and 8, the make-up of the piston assembly 4 may be readily viewed particularly the nature of piston holder indicated generally at 130, and how that piston holder 130, in turn, mounts for reciprocating movement between the relatively fixed piston track members 106. The piston holder indicated generally at 130 in similar to the end magnet holder 110 constitutes an open frame fashion magnetic assembly including laterally spaced end-walls 130A joined together near their bottoms, at opposite sides, by transverse curved struts 130B bearing arcuate recesses 130C on their upper faces upon which mounts piston 140. A pair of vice clamps 135, each bearing an arcuate recess as at 140A within the center of the same, form mirror images of the transverse struts 130B. They are mounted to the piston holder 130 via tapped and threaded holes 136A within the struts and through which bolts 135 project, the bolts passing initially through drilled holes 135A within the vice clamps 135. Ball bearings 131 are mounted for rotation about their axes on the inside of vertical walls 130A, at the top and bottom thereof, via bolts 132 and separators or spacers 139. The ball bearings 131 freely rotate about their axes. The ball bearings 131 roll along the piston tracks 106A of the piston track members 106. The tracks bear lips 106B along one edge thereof. The piston indicated generally at 140 consists of a laminated core 140C of ARMCO M-6 magnetic material, for instance, as at 141, which is wrapped by 200 wraps of 12 gauge magnet wire forming an electromagnetic coil 144, the coil 144 being held at either end by plastic spool fittings 143. Two copper strips 142 are glued across the piston periphery at the top and bottom which act as contacts for brushes 163 of the brush assemblies 160 at the top and bottom of the piston track members 106, FIG. 8. The respective ends of the electromagnet winding are connected mechanically to respective conductive copper strips 142 at the top and bottom of the winding 144. As may be appreciated from FIG. 8, the piston assembly 4 tracks horizontally over the piston tracks 106A prevented from moving off the tracks by lips 106B with the ball bearings 131 providing low friction movement for the piston assembly 4.

In order to shift each end magnet assembly 5 relative to the cylinder housing or casing 100 and to vary the gap between the end of the core 121 of end magnet 120 and the ends projecting 140C of the core 141 of the piston 140, each end magnet holder is mounted within the cylinder housing or casing 100 for slight longitudinal adjustment. This is achieved by providing a threaded hole 110H within base 110A of each end magnet holder and threading an adjusting screw 150 within that base 110A, FIG. 3. The threaded portion of adjustment screw 150 is extended at each end by unthreaded reduced diameter shaft portions 150B, 150C. One portion 150B, is received within a cylindrical hole 150A of leg 105 while the opposite end portion 150C projects through a hole 150A within the end cross member 103. The portion 150B projecting through hole 158 is slotted at 150D so that the shaft may be rotated to cause the base 110A to translate, forcing the end magnet 120 to shift towards or away from the piston 140 borne by the piston holder. Once positioned, a lock nut 151 which is threaded to the portion 150B of the adjusting screw 150 is locked down onto the end cross member 103, a washer 103A being interposed between the lock nut 151 and the face of the end cross member 103.

The motor is similar to a flatted internal combustion engine in that the central connecting crankshaft assembly 6 has interposed on opposite sides thereof, the left and right cylinder bank 2 and 3. The crankshaft 300 is mounted to the outer case 1 by way of a plurality of bearing assemblies indicated generally, at 303. Assemblies 303 include vertical support members 305 which are mounted upright on the base element 306 of the outer case 1. Marker 305 bear ball bearings as at 307 to permit the crankshaft 300 to rotate about its axis. Five ball bearing assemblies 303 are provided in the illustrated embodiment for supporting the crankshaft 300 at longitudinally spaced positions. A plurality of I-beam connecting rods 201 are rotatably connected at opposite ends to piston assembly 4 and to the crankshaft 300. The I-beam connecting rods 201 contain a piston bearing ring 202 at one end defining a hole 134A for the piston bearing 134 which is mounted to end bearing 134 is borne by a piston holder pin 130D projecting outwardly of piston holder vertical end wall 130A.

A crank bearin ring 304 is integrally formed on the opposite end of each connecting rod 201, and encloses or defining a hole 304A for the crank bearing 304. The crankshaft 300 is in turn found of a split type comprising five separate pieces each of which is press fitted with main bearings 307 borne by the main bearing support members 305. Further, eight flywheels 302 are linked in pairs by connecting pins 301, as shown, FIG. 2. Each flywheel contains a center hole 300A through which the crankshaft pin 300B press fits and four peripheral holes 301A and 302A. Hole 301A press fits connecting pin 301 while holes 302A are provided therein to alleviate stress on the center hole 300A. Each bearing 304 is press fitted into the crank bearing ring 203 of connecting rod 201 and fits over connecting pin 301, with spacer 301C. Thus, each connecting rod is linked directly to one pair of flywheels and each piston to one pair of split connecting rods 201.

As shown in FIG. 2, the timing distributor assembly 7, shown in dotted line, is positioned at one end of the crankshaft 300 to the left in FIG. 2. The timing distributor assembly 7, FIGS. 9, 10 and 11, comprises distributor 400 which in turn consists of an outer ring 401 and an inner ring 402 which are mounted individually by way of posts to a base plate 409. The base plate 409 bears a central aperture or opening as at 410 which carries collar 411 through which projects a portion 300A of shaft 300. The base plate 409 bears a peripheral flange as at 409A which has screws threaded to that flange by way of screws 412, an axially outer end plate 413. End plate 413 bears a circular hole as at 414, within which is mounted a collar 451 surrounding the projecting shaft portion 300A. The casing as defined by plates 409 and 415 is fixedly mounted to the cylinder housing or casing 100. The shaft portion 300A fixically bears a rotor assembly indiated generally at 408 constituted by a annular collar 408A which is locked to the shaft portion 300A by means of locking screw 407. Screw 407 threadably projects radially through the collar 408A to frictionally lock the collar 408A to the shaft portion 300A. Extending radially outwardly from collar 408A to the side of the collar opposite locking screw 407 is the rotor arm 408B. The collar and the arm may be formed of a non-magnetic material and within that arm are mounted a pair of radially spaced permanent magnets as at 405A and 406A; these permanent magnets rotating with the arm as the shaft 300 rotates.

Underlying the permanent magnets 405A and 406A on the rotor assembly 408 are a number of pick-up coils; two pick-up coils associated with permanent magnet 405A and two with permanent magnet 406A. In this respect, the outer ring 401 is fixedly mounted to the axially inner end plate 409 by way of a number of posts 403A which project from plate 410 at right angles thereto. The outer ring 401 bears adjustment screws 403 which pass through arcuate adjustment slots 403A, the screws being tightened down to the posts 403B to lock the outer ring at a given angular position. This locates the diametrically opposite pick-up coils 405 at particular positions with respect to the sweep of the rotor arm 408B and particularly, permanent magnet 405A which induces an electrical current within the pick-up coils 405 as the permanent magnet 405A sweeps across the coils during rotation of shaft 300. Similarly, the inner ring 401 which has an outer dimater slightly less than the inner diameter of the outer ring 401 and which is concentric therewith, being mounted to the axially inner end plate 409 by way of a pair of posts 404B which extend perpendicular to the end plate 409 and which bears threadably on their ends remote from plate 409, adjustment screws 404. These screws pass through arcuate, opposed adjustment slots 404A thereby permitting, by loosening of the screws, the angular shaft of the pick-up coils 406 borne by the inner ring 402 within limits defined by the extent of the arcuate slots 404A. The permanent magnet 406A which is radially inward of permanent magnet 405A is mounted on the arm of 408B at a position such that it sweeps across the tops of pick-up coils 406 thereby inducing electrical current pulses within those coils in succession as the shaft 300 rotates.

The pick-up coils 405 and 406 are employed to inihibit or enable a current to the primary coils of end magnets 120 by way of the circuitry to be discussed with reference to FIG. 12, and thus provides a timing distributor mechanism for the motor. As may be appreciated, the angular position of the arm 408B may be ajusted relative to the crankshaft 300 by backing off the locking or set screw 407, rotating the arm, and then locking it at reset position. In connecting the battery, sequentially, to the primary coils of the end magnets 120, for each of the left or right cylinder banks, it may be seen that as the piston 140 for a given left or right cylinder bank approaches the end magnet during oscillation of the piston assembly, the primary coil of that end magnet is energized to set up a permanent magnet field which opposes the permanent magnet field created by energization of the single coil borne by the piston assembly. In that respect, the brushes 163 act to maintain the single coil 144 of each piston assembly continuously energized, there being no reversal in current and thus no change in electromagnetic field for the piston assemblies as they reciprocate on the tracks 106A from one end magnet to another. Thus, momentarily there is an intense magnetic repulsive force generated when the piston reaches top dead center with respect to that end magnet, causing the piston to be forcably driven towards the opposite end magnet which at that time is de-energized. As the piston moves towards the opposite end magnet, the end magnet causing that repulsive forced movement is deenergized, and when the opposite end face of the piston reaches top dead piston position with respect to the new end magnet it has just approached, that end magnet primary coil is energized to set up the required magnetic repulsion force created by like magnetic fields at the end of fixed end magnet and the facing end of the piston thereby rapidly driving the piston in the opposite direction.

As an important aspect of the present invention, it must be appreciated that during the movement of the piston assembly which is formed of magnetic material, the moving magnetic lines of force generated by the energization of the primary coil of the piston are cut by fixed end magnet coil windings in turn generating an electrical current in the secondary winding of coil 123, which current may be fed back to the power source to recapture, a certain portion of the energy required to initiate the drive of the piston assembly. Thus, this effects a conservation of energy with improved efficiency in the transformation of electrical energy to mechanical force as derived by the shaft output rotation of crankshaft 300.

The motor control circuitry in accordance with the present invention will be discussed with reference to FIG. 12. Initially, both batteries 500 and 502 are fully charged to 24 volts, thereby providing a high output from comparator 504 to the input of OR gate 506. In response thereto OR gate 506 causes darlington pair 508 to conduct thereby closing relays 510 and 512. With on/off toggle switch 514 closed, the power current flows from battery 500 through relay 510, through the variable speed control potentiometer 516 through either of relays 518 or 520 through the associated load M1/M3, or M2/M4, back to negative ground. When the distributor is aligned such that $\theta = 0$ relative to the center line, the RS flip-flop 522 is reset such that Q=0 and $\overline{Q}=1$ thereby closing relay 520 to complete the path through transformers M2/M4. On the other hand, when $\theta$ is approximately 180°, depending on the timing set, Q=1 and $\overline{Q}=0$, thereby closing relay 518 and opening relay 520 so as to complete a path through transformers M1/M3.

During the motion of the magnetized piston relative to the fixed coils of the end magnets, an induced current will flow from the secondary windings of the fixed end magnets through the full wave rectifiers 524 and 526 back to battery 502. When the charge on battery 500 falls below 20 volts, and the charge on battery 502 is above 20 volts, the output from AND gate 528 will be low to force OR gate 506 low, which in turn closes relays 530 and 532. The primary current will then flow from battery 502 to transformers M1/M3 or M2/M4, while the induced current will be directed back to battery 500. Battery 502 will provide the primary current until the voltage on battery 502 falls below 20 volts while battery 500 rises above an 18 volt value. At this time, AND gate 528 will go high thereby forcing OR gate 506 high. The darlington pair 508 is again turned on thereby causing relays 510 and 512 to close. This state will then be maintained until either battery 502 rises above 20 volts or battery 500 falls below 18 volts. In the event that both batteries fall below an 18 volt value, battery 502 will supply power to the motor.

The very basis of the improvement in this art resides in using primary and secondary coils instead of simply electromagnets to drive the pistons in recycling the induced current from the secondary windings of those coils. As the engine speed increases, the induced secondary current increases proportionately to improve the energy conversion characteristics of the electric motor of this invention.

While the invention has been particularly shown and described with reference to preferred embodiments thereof, it will be understood by those skilled in the art that various changes in form and details may be made therein without departing from the spirit and scope of the invention.

What is claimed is:

1. An improved electromagnetically actuated linear reciprocating motor, said motor comprising:
   at least two laterally opposed axially spaced relatively fixed end magnet assemblies,
   said end magnet assemblies comprising primary and secondary electromagnet coils,
   an electromagnetic piston assembly mounted between said end magnet assemblies for reciprocation towards and away from said end magnet assemblies and being in axial alignment therewith, said piston assembly including a piston electromagnet coil,
   an electrical current source,
   means for supplying DC current from said source to said piston electromagnet coil for setting up a DC magnetic field within said piston,
   means responsive to piston assembly reciprocation for periodically connecting said source to said fixed end magnet primary coils for momentarily setting up like magnetic fields between the opposed ends of said piston coils and said end magnet primary coil when said piston coil is near top dead center at the end of its stroke to create momentary high repulsion forces between said piston assembly and said end magnet coil assemblies sequentially to rapidly effect reciprocation of said electromagnet piston assembly, and
   means for connecting said secondary electromagnet coils of said end magnet assemblies to said electrical source to return electrical power induced within said secondary coils to said source as a result of movement of said piston assembly.

2. The improved electromagnetically actuated linear reciprocating motor as claimed in claim 1, wherein said electromagnetic piston assembly comprises a piston holder, said piston holder comprises an open frame magnetic assembly including laterally spaced vertical end walls, transverse struts bearing arcuate recesses within upper faces and connecting the bottoms of said spaced vertical end walls, a magnetic core extending parallel to said walls and having ends received within the arcuate recesses of said struts, a pair of vice clamps each bearing an arcuate recess within the center of the same and forming mirror images of said transverse strut recesses extending between said laterally spaced walls, said vice clamps being fixed at their opposite ends to respective vertical end walls, and clamping said core to said piston holder, said piston coil being mounted to said core concentrically surrounding said core and interposed between said struts and said vice clamps, a casing surrounding said laterally opposed axially spaced end magnet assembly for stationarily supporting said end magnets, piston track members fixedly mounted to said housing at opposite sides thereof and facing each other, and rollers mounted to opposite edges of said magnet holder end wall and in rolling contact with respective piston track members, such that the end magnet holder constitutes a horizontally reciprocating carriage for said piston coil to and from said opposed end magnet assemblies.

3. The improved electromagnetically actuated linear reciprocating self-timed motor as claimed in claim 2, wherein said electromagnet piston assembly further comprises a metal contact strips fixed to the outer periphery of the piston coil and extending parallel to the coil axis on opposite sides thereof, and said piston track members each bear an electrical brush which projects from the face thereof and bears on a respective contact strip and wherein said metal contact strips are electrically connected to respective ends of said piston core and said brushes are electrically connected to said electrical current source.

4. The improved electromagnetically actuated linear reciprocating motor as claimed in claim 3, wherein each track member is tapped and threaded, a cylindrical brush in holder threadably mounted within the threaded hole of each piston track member and a cylindrical carbon brush is slidably mounted within said brush holder cylinder, and spring biased such that its projecting end contacts the surface of a respective strip contact carried by said piston coil.

5. The improved electromagnetically actuated linear reciprocating motor as claimed in claim 1, further comprising end magnet holders for each end magnet assembly, said each of end magnet holders being of rectangular open frame construction formed of magnetic material and including a relatively thick horizontal base of rectangular cross-section, said end magnet assembly being fixedly mounted within said rectangular open frame end magnet holder, a threaded hole extending longitudinally within said base, an adjustment screw threadably borne by said base threaded hole and being mounted for rotation about its axis within said housing such that rotation of said shaft causes said end magnet holder to translate causing the end magnet assembly to shift axially towards or away from said piston coil to adjust the minimal gap between the end coil assembly and the piston coil during reciprocation of the piston holder.

6. The improved electromagnetically actuated linear reciprocating motor as claimed in claim 1, further comprising a crank shaft mounted for rotation about axis and wherein said at least one pair of laterally opposed axially spaced end magnet assemblies comprises at least two in number, said assembly pairs being laterally spaced with respect to each other, said housing including means for fixedly locating said pairs of laterally opposed axially spaced end magnet assemblies on opposite sides of said crank shaft, and such motor further comprises piston rods rotatably mounted to said crank shaft at one end and to said piston holders at the other end, and wherein said means for periodically energizing said end magnet assembly primary coils comprise means responsive to the rotation of said crank shaft.

7. The improved electromagnetically actuated linear reciprocating motor as claimed in claim 6, wherein said housing bears a distributor through which extends a portion of said crank shaft, said distributor comprising angularly adjustable stationary outer and inner rings concentrically surrounding said shaft portion, said inner ring mounting at least one circumferentially spaced pair of pick up coils, said outer ring mounting at least one pair of circumferentially spaced pick up coils, and said shaft bearing a rotor including an arm extending radially outwardly therefrom and bearing permanent magnets at given radial distances corresponding to the radial positioning of the pick up coils of said inner and outer rings respectively, such that during rotation of said rotor assembly, said pick up coils are periodically electrically pulsed and wherein said pick up coils are operatively connected to said end magnet assembly primary coils for self-timed energization of the primary coils to produce the magnetic repulsive fields, causing magnetically induced reciprocation of respective piston assemblies and rotation of said crank shaft.

8. The improved electromagnetically actuated linear reciprocating motor as claimed in claim 2, wherein said means for periodically connecting said source to said fixed end primary magnet coil comprises means for determining the position of said electromagnetic piston assembly with respect to said end magnet assemblies for providing a pair of energization pulses, bistable means receiving said energization pulses providing a pair of complementary outputs, and relay means receiving said complementary outputs, said relay means selectively delivering said electrical current source to one of said end magnet assemblies.

9. The improved electromagnetically actuated linear reciprocating motor as claimed in claim 8 wherein said means for connecting said secondary electromagnet coils of said end magnet assemblies to said electrical source comprises at least two rectifying circuits, each of said rectifying circuits provided for each of said end magnet assemblies, said rectifying circuits receiving current from said secondary electromagnet coils, and delivering rectified current to said electrical current source.

10. The improved electromagnetically actuated linear reciprocating motor as claimed in claim 9 wherein said electrical current source comprises at least a first and second battery source, and logic means responsive to the voltage level one each of said battery sources, said logic means delivering current to said end magnet assemblies from one of said battery sources at an given time, said rectifying circuits providing rectified current to another of said battery sources at said given time.

* * * * *